United States Patent [19]
Aguilhon et al.

[11] Patent Number: 5,398,243
[45] Date of Patent: Mar. 14, 1995

[54] ARBITRATION METHOD AND BUS FOR SERIAL DATA TRANSMISSION

[75] Inventors: Bernard Aguilhon, Villeneuve-Loubet; René Doucet, Le Touvet; Jean-Francois Karcher, Valbonne, all of France

[73] Assignee: Telemecanique, France

[21] Appl. No.: 894,484

[22] Filed: Jun. 5, 1992

[30] Foreign Application Priority Data

Jun. 5, 1991 [FR] France ................. 91 06809

[51] Int. Cl.⁶ ............................ H04L 12/40
[52] U.S. Cl. ................. 370/85.6; 370/85.11; 340/825.51
[58] Field of Search ............ 370/85.6, 85.1, 85.2, 370/85.3, 85.9, 85.11; 364/242.92; 340/825.5, 825.51

[56] References Cited

U.S. PATENT DOCUMENTS

| | | | |
|---|---|---|---|
| 4,063,220 | 12/1977 | Metcalfe et al. | 340/825.5 |
| 4,593,282 | 6/1986 | Acampora et al. | 370/85.6 |
| 4,626,843 | 12/1986 | Szeto et al. | 370/85.6 |
| 4,656,627 | 4/1987 | Hasley et al. | 370/85.11 |
| 4,667,192 | 5/1987 | Schmid et al. | 340/825.5 |
| 4,719,620 | 1/1988 | Machino et al. | 370/85.6 |
| 5,107,492 | 4/1992 | Roux et al. | 370/85.6 |
| 5,124,983 | 6/1992 | Landez et al. | 370/85.6 |
| 5,172,373 | 12/1992 | Suzuki | 370/85.11 |

FOREIGN PATENT DOCUMENTS

WO86/3925 3/1986 WIPO .

OTHER PUBLICATIONS

R. Mitchell et al., "An Integrated Serial Bus Architecture: Principles and Applications" IEEE Transactions on Consumer Electronics: vol. CE-31, No. 4, Nov., 1985, New York, pp. 687-691.

Primary Examiner—Douglas W. Olms
Assistant Examiner—Hassan Kizou
Attorney, Agent, or Firm—William A. Drucker

[57] ABSTRACT

Arbitration between collisions is performed by means of a special arbitration path ARB conveying access requests expressed in the form of arbitration frames ARB %. An arbitration frame includes a priority field defining different classes of traffic, and a numerical field identifying each station, together with bits that relax priority constraints. The application of arbitration frames is subordinate to recognizing that a delimiter channel of the data path DATA is in an active state. The invention is applicable to industrial networks or buses.

11 Claims, 2 Drawing Sheets

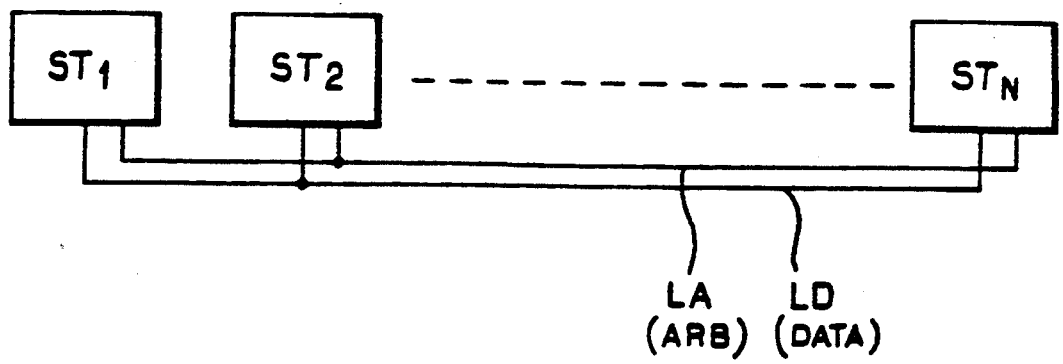
FIG.1
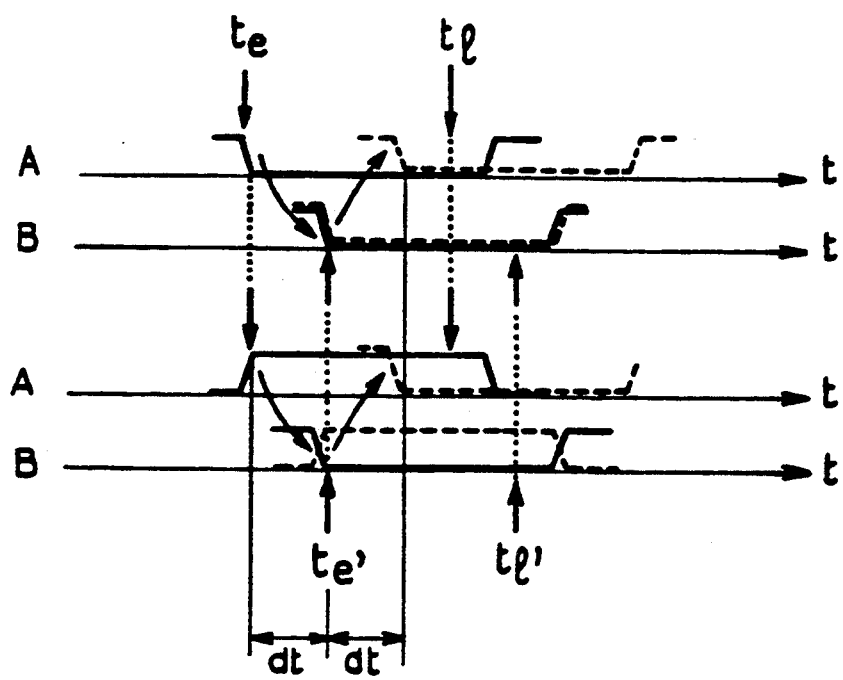
FIG.2a
FIG.2b

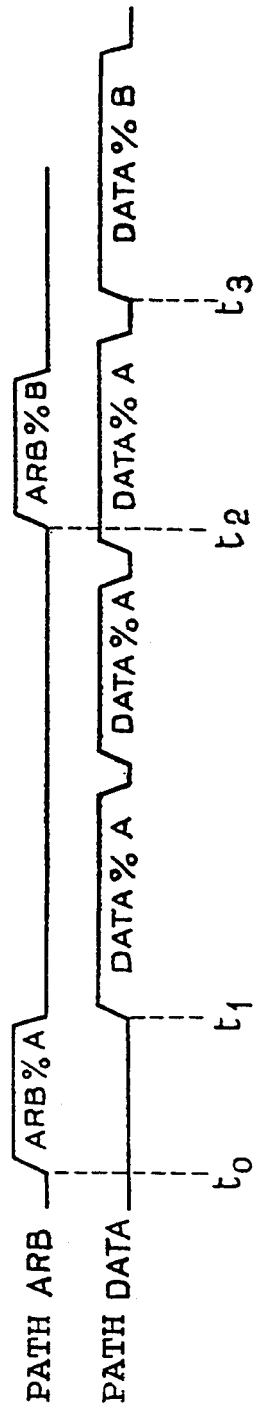
FIG_3
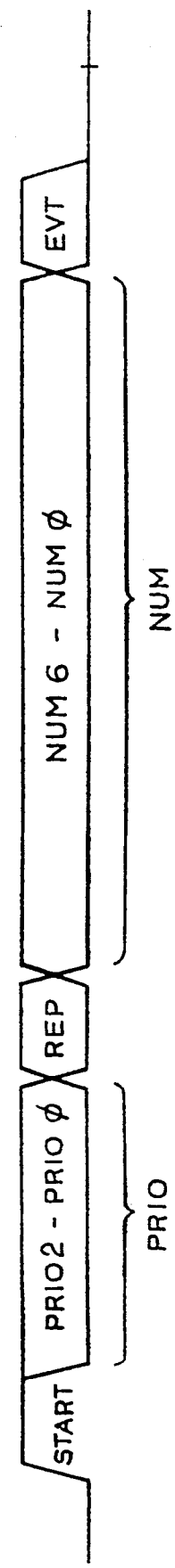
FIG_4

ARBITRATION METHOD AND BUS FOR SERIAL DATA TRANSMISSION

The present invention relates in general to transmitting data on a serial line between a plurality of originating and/or receiving stations, particularly, but not exclusively, for industrial local networks or buses, or the like.

BACKGROUND OF THE INVENTION

Networks or buses are already known in which the physical connection between stations is provided by a serial line for serial transmission with random access and collision detection, and they are referred to as "CSMA/CD" (Carrier-Sense Multiple-Access/Collision-Detection) networks or buses. Such networks control allocation of the serial line by arbitration means designed to resolve conflicts between a plurality of stations requesting the line substantially at the same instant. Thus, the "Ethernet" CSMA/CD network uses a common line both for line arbitration and for conveying data.

That system and similar systems nevertheless suffer from the major drawback of losing time in the event of a collision between two stations that have both attempted to send data at the same moment. It is then necessary to discard frames that have been disturbed by the collision and to allocate the network to one of the stations before data interchange can be restarted, and then all of the discarded frames must be retransmitted. The overall bit rate at which digital data is effectively interchanged thus drops sharply when conflicts of access are numerous.

An object of the present invention is to control allocation of the serial line in time that is masked from the interchanges of data that are performed on said line, thereby avoiding the need, in the event of a collision, to discard interfering frames or to repeat an interchange that has been disturbed.

The invention also seeks to coordinate in simple manner the transfer of data and the arbitration process, and to guarantee that the serial line is allocated quickly to all stations requesting it.

SUMMARY OF THE INVENTION

To this end, the present invention provides an arbitration method for access to a serial line for interchanging data and having a plurality of stations connected thereto. The method is implemented on a special arbitration path in the form of a serial arbitration line with collision which interconnects the various stations and which defines a dominant state and a recessive state. Each station desiring to obtain access to the data interchange line (including, where applicable, a station having access and desiring to retain it in the presence of an access request from another station) applies an arbitration frame to the arbitration path in synchronous mode, said frame including items that define access priority, e.g. a priority field which defines a priority level and a numerical field which identifies each station, each of said fields being constituted by one or more bits. After a predetermined time delay following the application of each bit, the station reads the value of the bit present on the arbitration path and then ceases to apply its arbitration frame as soon as the value of the bit read in the priority field (and in the event of equal priority levels, in the numerical field) differs from the value of the corresponding bit it is applying such that at the end of the arbitration frame, only one station has not ceased to apply its arbitration frame and is thus authorized to access the data interchange line.

Preferably, the applications of arbitration frames by requesting stations in collision are mutually synchronized by the beginning of the first frame to be applied by one of the stations; in addition, the beginning of an arbitration frame is synchronized relative to the beginning of data interchange activity on the line by a channel delimiting the data path.

Rotating priority may advantageously be established between different categories of traffic on the data line by means of a signal that may be generated in each station to change the priority field in the arbitration frame.

In order to avoid access to the bus always being given to the same station in the event of repeated conflicts between stations having the same priority level, the arbitration field may further include, between the priority field and the numerical field, a repeat field which enables a station temporarily to increase its priority level.

BRIEF DESCRIPTION OF THE DRAWINGS

Other aspects, objects, and advantages of the present invention appear more clearly on reading the following detailed description of a preferred implementation of the invention, given by way of non-limiting example and made with reference to the accompanying drawings, in which:

FIG. 1 is a diagram of a bus of the present invention having a plurality of stations connected thereto;

FIGS. 2a and 2b show a first aspect of the arbitration mechanism of the invention;

FIG. 3 shows a second aspect of the arbitration mechanism of the invention; and

FIG. 4 shows an example of the contents of an arbitration frame as used in the invention.

DETAILED DESCRIPTION

FIG. 1 shows a plurality of stations $ST_1$, $ST_2$, ..., $ST_N$ for interchanging digital data between one another, for example variables and/or messages, by means of a bus. The stations may be connected to the bus via integrated gate arrays defining the required interface logic.

Physically, the bus comprises an arbitration line LA and a data line LD, thus constituting two distinct but coordinated serial paths referred to as the arbitration path referenced ARB and the data path referenced DATA. Three physical channels are implemented on these two functional paths, namely an arbitration channel on the path ARB, and both a delimiter channel and a data channel on the path DATA.

The delimiter channel has two physical states: "high" and "low", for conveying two logic states, namely and respectively a rest state and an active state. It provides the envelope for elementary data sequences (where each sequence is constituted by a succession of frames) for the purpose of synchronizing the paths ARB and DATA and for providing the bus with good immunity. In addition, in the active state, it transmits a clock generated by the master station on the bus to enable the stations that receive the sequences to sample the data channel.

The path ARB conveys frames, each of which represents a request by a station for bus allocation. The bits of arbitration frames are transmitted in non-coded form, with a zero or low voltage representing a low or "0" logic signal while a voltage of +5 volts, or more generally a high voltage represents a high or "1" logic signal.

The bit rate on the path DATA may typically be 12 Mbits/second. A high bit rate is not necessary on the path ARB. In addition, the mechanism described below for controlling collisions requires each bit to be applied during a minimum duration that is tied to the propagation time of signals over the path.

Arbitration of access to the bus is performed in parallel with the flow of data, without requiring a special bus controller circuit, but with collisions being controlled within each station. That is why the arbitration is referred to below as being "dispersed".

The path ARB has two physical states: a recessive state and a dominant state. The rest position (station not transmitting) corresponds to the recessive state. As soon as a single module is transmitting a dominant state, that state propagates over the path ARB at the signal propagation velocity. By convention, it is assumed herein that a low physical level on the arbitration line constitutes the dominant state, while the high physical level constitutes the recessive state. This is achieved easily, e.g. using open-collector outputs at each station.

when logic inverters are provided in the interfaces between the stations and the bus, then the dominant state corresponds to a logic level "1" at the station while the recessive state corresponds to a logic level "0".

For each bit in an arbitration frame for which the collision mechanism is operative, the originating station compares the state it is applying with the state it reads from the path at a later instant. This instant is determined as a function of the maximum propagation time of signals on the path, which is itself a function of the physical line length. Similarly, the time interval between applying two consecutive bits is selected as a function of said propagation time.

Two possible cases of conflict between stations A and B are described below with reference to FIGS. 2a and 2b. $t_e$ designates the instant at which A applies a bit to the bus, and $t_l$ designates the instant at which the state of the bus is read by the same station. $t_e'$ and $t_l'$ designate the instants at which the station B applies a bit to the bus and at which it reads the bus. In these figures, it is assumed that A is the first to apply a frame and that B applies its frame as soon as it has observed that A is doing so, i.e. after a delay dt that is tied to the propagation velocity on the line. B thus applies all of its bits with a delay dt relative to A. For each station, solid lines represent the signals as applied and dashed lines represent the signals as received.

In FIG. 2a, both stations apply a dominant low level. The bus is in the dominant state at station A at instant $t_l$, and at station B at instant $t_l'$, so both stations detect identity between the state applied and the state read. The same situation would apply if both stations were the only two stations transmitting and both were applying a high level: the bus would remain in the recessive state.

In FIG. 2b, A begins by applying a high level, and after the time interval dt, B applies a low level. At instant $t_l$, the bus has switched to the low level, since the low level applied by B has propagated as far as A, as represented by the dashed lines. At station B, the level read is low because the same station is applying a low level. Thus station B observes that the state it reads is identical to the state it is applying, whereas station A observes that there is a difference between the state it is applying and the state it reads.

Station A which observes this difference immediately ceases to apply its arbitration frame, whereas station B continues to apply its frame for so long as the above-mentioned identity continues to be true, bit after bit. Any station which ceases to apply its frame has lost the right to take charge of the bus and must renew its request. In contrast, a station which observes agreement between the states it applies and the states it reads all the way to the last bit of the frame in collision takes charge of the bus.

To sum up, any station that finds itself applying a high bit to the bus while at least one other station is applying a low bit, withdraws from the competition.

By using this deterministic mechanism for detecting collisions, the arbitration path can settle problems of bus allocation between the various requesting stations without requiring a special bus controller.

FIG. 3 shows how the flow of data sequences on the path DATA is parallel with the flow of arbitration frames on the path ARB. A station A begins by applying an arbitration frame referenced ARB % A at an instant $t_0$ to the path ARB. Assuming that no other station requests the bus, A takes charge of the data path since the state of each of the bits it reads from the bus is identical to the state it applies thereto. Thereafter, from instant $t_1$, it transmits successive data sequences referenced DATA % A, without needing to apply new frames ARB % A.

Subsequently, at an instant $t_2$ while A is transmitting a sequence DATA % A, a station B requests the line by applying an arbitration frame ARB % B (where synchronization between the flow of data on the paths ARB and DATA is described below), and several sets of circumstances can be envisaged:

a) If A wishes to keep charge of the bus, as soon as it detects the beginning of the arbitration frame as applied by B, it applies a new arbitration frame ARB % A. The two frames ARB % A and ARB % B confront each other and the station having the highest priority wins.

b) If A has no more data to transmit it does not apply a new arbitration frame. B takes charge of the bus and can be begin transmitting its own sequences DATA % B (starting from instant t3) once the last sequence DATA % A has terminated, which happens while arbitration is taking place.

It can be observed that the arbitration process does not require any data frame to be discarded nor does it require any data interchange to be repeated.

FIG. 4 shows an arbitration frame ARB %. This frame comprises in succession: a start bit START, a priority field PRIO comprising three bits PRIO2 to PRIO0, a repeat bit REP, a numerical field NUM comprising seven bits NUM6 to NUM0, and a bit EVT representing a global variable for allocating priority to cyclical data or to event data. Naturally, the numbers of bits and the way they are distributed can vary without going beyond the ambit of the invention. The duration of each bit and the time delay dt mentioned above with reference to FIGS. 2a and 2b are appropriately selected as a function of the propagation velocity on the line and of the length of the line. For a bus that is several tens of meters long, the duration of each bit may be about 850 ns, thus giving an arbitration frame a duration of about 12 μs. The data sequences may have a duration of about 10μ to 40 μs, such that collision control can take place practically without overflowing a data sequence, and thus without disturbing the data bit rate.

The field PRIO specifies a priority level attributable to the type of traffic requested, and it is generated by the station itself on a case-by-case basis as a function of a priority value $V_{PRIO}$ desired for the data interchange to be performed and as a function of the parameter EVT. The field NUM serves to identify the station, e.g. topologically.

As a preamble to describing the fields PRIO and EVT, it is specified that, in the present example, interchanges over the bus are divided into three categories:
  priority interchanges (traffic class T0, e.g. having four levels of priority T00 to T03) corresponding to a certain number of connections for which it is desired that access time to the bus should be quick and deterministic;
  cyclical interchanges (traffic class T1 or T2, selected depending on the value of the parameter EVT, with each class having two priority levels, for example: T10, T11 or T20, T21) which correspond to all of the accesses that are regularly requested (for example regular interchanges of variables); and
  event interchanges (traffic class T2 or T1 selected as a function of the value of the parameter EVT) which occur randomly. They may relate, for example, to a bulletin board service.

Rotating priority for bus access is provided in order to ensure that:
  when a station makes a request to take charge of the bus for a priority interchange, it always overrides other types of interchange;
  when the only interchanges that are requesting use of the bus are cyclical interchanges, then the full passband of the bus is made available to them; and
  when stations are requesting access both for cyclical interchanges and for event interchanges, then each category of interchange has up to one-half of the passband of the bus made available thereto.

This rotating priority is governed by the global binary variable EVT which always changes state from one arbitration to the next. Depending on whether EVT is in the recessive state or the dominant state (EVT=0 or EVT=1), priority is given either to cyclical interchanges or else to event interchanges.

Each frame applied by a winning station must be such that its EVT field has the opposite value to the immediately preceding winning frame. To this end, all of the stations connected to the bus possess a bistable $B_{EVT}$ which generates a priority level change signal whose state is required permanently to mirror the global variable EVT. To this end, each station connected to the bus reads the contents of the field EVT in each winning arbitration frame and causes its bistable to take up the inverse binary state.

When a station needs to transmit data, it declares a priority value $V_{PRIO}$ lying in the range 0 to 7, with the following meanings:
  0 to 3: the four higher priority levels, where 0 represents the highest priority level; and
  4 to 7, the four priority levels for cyclical and event interchanges, split up into two levels 4 and 5 for cyclical interchanges and two levels 6 and 7 for event interchanges. In practice, levels 4 and 6 may be allocated to normal traffic, while levels 5 and 7 are allocated to batch type traffic.

The relationships between $V_{PRIO}$, the class of traffic determined by the contents of bistable $B_{EVT}$, and the effective value of the field PRIO in the arbitration frame to be applied are the following: when EVT=0 (cyclical traffic has priority):

| $V_{PRIO}$ | Class of traffic | PRIO2-PRIO0 |
| --- | --- | --- |
| 0 | T00 | 000 |
| 1 | T01 | 001 |
| 2 | T02 | 010 |
| 3 | T03 | 011 |
| 4 | T10 | 100 |
| 5 | T11 | 101 |
| 6 | T20 | 110 |
| 7 | T21 | 111 |

| VRPRIO | Class of traffic | PRIO2-PRIO0 |
| --- | --- | --- |
| 0 | T00 | 000 |
| 1 | T01 | 001 |
| 2 | T02 | 010 |
| 3 | T03 | 011 |

EXAMPLE 1 station A requests a cyclical interchange (e.g. $V_{PRIO}=4$), a module B requests a normal type event interchange ($V_{PRIO}=6$), and a module C requests a batch type event interchange ($V_{PRIO}=7$). On the first frame collision, cyclical interchanges have priority (EVT=0).

Modules B and C must therefore repeat their requests.

During the following collision between the frames originating from B and C, event interchanges have priority (EVT =1), so B wins.

Cyclical interchanges then have priority again. C, now the only station originating a frame, takes charge of the bus.

The function of the bit REP is now described in detail, with the level thereof serving to request either normal mode access or else repeat mode access. The object of repeat mode is to guarantee access to the bus for all stations having the same level of priority. Implementing this bit in repeat mode is equivalent to temporarily increasing the priority level of a losing station compared with other stations having the same level of priority.

The rules governing this bit are the following:
  at rest, the bit REP is in normal mode in all stations;
  the bit REP in a station goes to repeat mode as soon as a station has failed to gain access to the bus because of an unfavorable collision with other stations having the same level of priority, and the bit REP read from the bus was in the inactive state (REP=0); and
  the bit REP of a station returns to normal mode as soon as the station takes charge of the bus.

The numerical field NUM serves to identify each station for the purpose of distinguishing between stations having the same priority PRIO and REP. For example, when the bus interconnects modules received in boxes, the more significant bits of NUM may represent the box number while the less significant bits represent the number of the module within the box.

When the fields PRIO and REP are identical in two conflicting frames applied simultaneously by two stations, the bits NUM6-NUM0 distinguish between the stations, with the winning station being the station having the lower identifier NUM. Since all of the stations have different identifiers NUM, each collision gives rise to one winner only.

EXAMPLE 2

To illustrate a conflict between stations, assume that priority is being given to cyclical traffic (EVT=0) and that four stations numbered 0, 1, 2, and 3 in decimal notation all desire simultaneously to take charge of the bus, with station No. 2 having priority level 4 while stations Nos. 0, 1 and 3 all have the same priority level 5.

On the initial collision, station No. 2 wins. The other stations must repeat their requests, and they do so in normal mode (REP=1).

On the next conflict, EVT=1 and all three frames on the bus have the same priority; the bus is allocated on the basis of the field NUM, with priority going to the lowest identifier, and thus to station No. 0. Since the priority level is the same for all of the frames, stations Nos. 1 and 3 go to repeat mode (REP=0). If some other station should then request access having the same priority, station No. 1 will win over that other station because of its dominant bit REP which precedes the field NUM, and it will win over the station No. 3 because of the lower value in its field NUM.

Within the data frames themselves, conventional data interchange techniques may be used, in particular variables and/or messages which associate the data per se, in an appropriate preamble either with a data identifier (for a variable), or else with an address field which includes the address of the originator and the address of the destination (for a message).

Synchronization between the paths ARB and DATA is described briefly below.

A station connected to the bus must be able to recognize quickly and reliably the frames ARB and DATA of interchanges that are taking place.

It is preferable for all interchanges to be synchronized by the signals on the path DATA which is listened to on a permanent basis by all of the stations. This synchronization is performed by detecting activity on the delimiter channel. When the delimiter channel is inactive, the path DATA is at rest. Synchronization is based on the principle that, between two consecutive data sequences, the delimiter channel must pass through the inactive state for a period of time that is sufficient to allow all of the stations to detect said state.

In addition, a station seeking to take charge of the bus must also be capable of synchronizing itself on the path ARB so as to know when to begin applying an arbitration frame. To this end, the rule consists in that an arbitration frame must not be applied while a data sequence is beginning on the path DATA. Consequently, on detecting the beginning of a sequence on the path DATA, the path ARB is necessarily at rest.

The station which takes charge of the bus must ensure that the path ARB is at rest before it begins sending a data sequence over the path DATA. In each of the other stations, if the beginning of a data sequence is detected on the path DATA while that other station is applying an arbitration frame, then it immediately stops applying said frame and it repeats its request at a later time.

Although the word "bus" has been used herein to designate the line interconnecting the various stations, it is clear that this term is not to be interpreted restrictively, and the invention is applicable both to buses and to networks. It applies in general to any environment in which physically separate stations need to be able to interchange digital data over lines of moderate length.

We claim:

1. An arbitration method for gaining access to a serial data transmission path having a plurality of stations connected thereto, said data transmission path defining a delimiter channel having an active state corresponding to the transmission of a data sequence and an inactive state corresponding to non-transmission of data, each station being capable of determining the state of said delimiter channel, the method being implemented on a separate arbitration path in the form of a serial collision-type arbitration line which interconnects the various stations and which defines a dominant state and a recessive state, each station being capable of applying to said arbitration path an arbitration frame comprised of elementary bits each having a value corresponding to either of said dominant and recessive states, a plurality of said bits defining a priority level for accessing to said data transmission path, the method including, for each station seeking to have or keep said data transmission path allocated thereto and to transmit data on said data transmission path, the following steps:

(a) applying to said arbitration path an arbitration frame according to the following rules:

if no arbitration frame is currently being applied by another station, said application step is started at any time, however, if the state of said delimiter channel passes from inactive to active state during the application of said arbitration frame, then said application of arbitration frame is stopped and started again later, and if said station already has said data transmission path allocated thereto, said arbitration path is listened to and an arbitration frame is applied to said arbitration path as soon as another station has started applying to said arbitration path another arbitration frame, the application of said arbitration frame on said arbitration path being synchronized with the beginning of application of said other arbitration frame by said other station, (b) reading of the value Of the bit present on said arbitration path after a predetermined time delay following the application of each bit of said arbitration frame, (c) ceasing to apply said arbitration frame as soon as the value of the bit read is different from the value of the corresponding bit it currently applies to said arbitration path, whereby, at the end of said arbitration frame, only one station which has not ceased to apply its arbitration frame is entitled to gain access to said data transmission path, and (d) said only one station transmitting data on said data transmission path after any data sequence currently transmitted has ended, whereby no data sequence re-transmission is required after an arbitration has occurred.

2. A method according to claim 1 wherein the arbitration frames applied by different stations to said arbitration path are synchronized by a start field of the arbitration frame which has started to be applied first.

3. An arbitration method for gaining access to a serial data transmission path having a plurality of stations connected thereto, the method being implemented on a separate arbitration path in the form of a serial collision-type arbitration line which interconnects the various stations and which defines a dominant state and a recessive state, each station being capable of applying to said arbitration path an arbitration frame comprised of elementary bits each having a value corresponding to either of said dominant and recessive state, each arbitration frame including a priority field defining a priority level followed by a numerical field uniquely identifying the station which applies the arbitration frame, and the application of colliding arbitration frames by each station being synchronized with the start of the first applied arbitration frame, the method including, for each station seeking to have or keep said data transmission path allocated thereto and to transmit data on said data path, the following steps:

(a) applying to said arbitration path an arbitration frame, (b) reading of the value of the bit present on said arbitration path after a predetermined time delay following the application of each bit of said arbitration frame, (c) ceasing to apply said arbitration frame as soon as the value of the bit read is different from the value of the corresponding bit it currently applies to said arbitration path, whereby, at the end of said arbitration frame, only one station which has not ceased to apply its arbitration frame is entitled to gain access to said data transmission path, and further including in each station the following steps:

(d) inverting a priority level changing signal between the application of two successive arbitration frames, and (e) prior to applying an arbitration frame, generating the priority field of said frame as a function of the state of said priority level changing signal and as a function of a priority value allocated to the requested data transmission.

4. A method according to claim 3 wherein, in order to ensure that the logic states of the priority changing signals in all stations are identical, it further includes, in each station applying an arbitration frame to said arbitration path, the following steps:

(f) determining the state of a field of said frame as a function of the state of its own priority level changing signal, (g) reading the state of said field of the frame applied by the station that gains access to the data path, and (h) defining the new state of its own priority level changing signal as a function of the state it has read.

5. A method according to claim 4 wherein the step of inverting the logic state of the priority changing signal interexchanges the priority levels of cyclical data transmissions and event data transmissions.

6. A method according to claim 5 wherein are also provided priority data transmissions with a permanent priority level which is higher than the priority levels of cyclical data transmissions and event data transmissions.

7. A method according to claim 1 wherein each arbitration frame further includes a repeat field associated with the bits defining said priority level, and wherein in the event of collision between arbitration frames from stations having the same priority level, losing stations have their repeat field changed so as to simulate a higher priority level until they have gained access to said data path.

8. A communications system including a plurality of stations and a bus, interconnecting said stations, said bus including a digital data transmission path defining a delimiter channel having an active state and an inactive state corresponding to the transmission and non-transmission of a data sequence, each station being capable of determining the state of said delimiter channel, said bus further including a separate arbitration path in the form of a serial collision-type arbitration line, which defines a dominant state and a recessive state, each station being capable of applying to said arbitration path an arbitration frame comprised of a plurality of bits each having a value corresponding to either of said dominant and recessive states, and of transmitting data on said data transmission path, each station comprising:

means for determining the presence or absence of an arbitration frame applied by another station on said arbitration path, means for determining the state of said delimiter channel, means for applying to said arbitration path an arbitration frame that includes a plurality of bits defining a priority level of t, he data to be transmitted whenever the station seeks to have or keep said data transmission path allocated thereto and to transmit data on said data path, said applying means operating according to the following rules:

if no arbitration frame is in the course of being applied to said arbitration path by another station, the arbitration frame application is started at any time, however, if the state of said delimiter channel passes from inactive to active state during the application of said arbitration frame, then said application of the arbitration frame is stopped and started again later, and if a station already has said data transmission path allocated thereto, said arbitration path is watched and an arbitration frame is applied to-said arbitration path as soon as another station has started applying to said arbitration path another arbitration frame, the application of said arbitration frame on said arbitration path being synchronized on the beginning of application of said other arbitration frame, and means for reading of the value of the bit present on said arbitration path after a predetermined time delay following the application of each bit of said arbitration frame, the application of said arbitration frame being interrupted by the station as soon as the value of the bit read is different from the value of the corresponding bit it currently applies to said arbitration path, whereby, at the end of said arbitration frame, only one station which has not ceased to apply its arbitration frame is entitled to gain access to said data transmission path, and said only one station transmitting data on said data transmission path after a data sequence currently transmitted has ended, whereby no data sequence retransmission is required when an arbitration has occurred.

9. A communications system including a plurality of stations and a bus, said bus including a digital data transmission path interconnecting said stations, said data transmission path defining a delimiter channel having an active state corresponding to the transmission of a data sequence and an inactive state corresponding to non-transmission of data,said bus further including a separate arbitration path in the form of a serial collision-type arbitration line which also interconnects said stations and which defines a dominant state and a recessive state, each station being capable of applying to said arbitration path an arbitration frame comprised of a plurality of bits each having a value corresponding to either of said dominant and recessive states, each station comprising:
- means for determining the presence or absence of an arbitration frame applied by another station on said arbitration path,
- means for determining the state of said delimiter channel,
- means for applying to said arbitration path an arbitration frame including a priority field defining a priority level of the data to be transmitted, followed by a numerical field which uniquely identifies the station, in synchronism with arbitration frames applied to said arbitration path by other stations,
- means for reading of the value of the bit present on said arbitration path after a predetermined time delay following the application of each bit of said arbitration frame, the application of said arbitration frame being interrupted by the station as soon as the value of the bit read is different from the value of the corresponding bit it currently applies to said arbitration path, whereby, at the end of said arbitration frame, only one station which has not ceased to apply its arbitration frame is entitled to gain access to said data transmission path, each station further including:
- a bistable,
- means for inverting the logic state of said bistable between the application of two successive arbitration frames, and
- means for generating the priority fields of each arbitration frame as a function of the logic state of said bistable and of a priority value allocated to the requested data transmission.

10. A communications system according to claim 9 wherein, in order to ensure that the logical states of the bistables in all stations are identical, each station further includes means for determining the state of a field in each arbitration frame as a function of the state of its own bistable, means for reading the state of said field in the frame as applied by the station which gains access to said data path, and means for determining a new state in its own bistable as a function of the state as read.

11. A communications system according to claim 8 wherein each arbitration frame includes a repeat field associated with the priority bits, and wherein each station includes means for changing the state of said repeat field in the event of collision between arbitration frames from stations having the same priority level, so as to simulate a higher priority level until said station has gained access to said data path.

* * * * *